United States Patent [19]

Pirlet

[11] 4,227,813
[45] Oct. 14, 1980

[54] PROCESS FOR DETERMINING A DIMENSION OF AN OBJECT

[75] Inventor: Robert A. Pirlet, Embourg, Belgium

[73] Assignee: Centre de Recherches Metallurgiques Centrum voor Research in de Metallurgie, Brussels, Belgium

[21] Appl. No.: 884,169

[22] Filed: Mar. 7, 1978

[30] Foreign Application Priority Data

Mar. 10, 1977 [BE] Belgium ................................ 852370
Mar. 10, 1977 [BE] Belgium ................................ 852372

[51] Int. Cl.³ ...................... G01B 11/00; G01C 3/20
[52] U.S. Cl. ........................................ 356/372; 356/1; 356/387
[58] Field of Search .................. 356/1, 4–5, 356/138, 152, 371–372, 375–376, 386–387, 380; 250/223–224, 231 SE, 561, 578

[56] References Cited

U.S. PATENT DOCUMENTS

| 3,016,464 | 1/1962 | Bailey | 356/1 |
| 3,610,754 | 10/1971 | Pirlet | 356/5 |
| 3,899,663 | 8/1975 | Pirlet | 356/376 |

FOREIGN PATENT DOCUMENTS

1175998 1/1970 United Kingdom ..................... 356/375

OTHER PUBLICATIONS

Kerr, J. R. "A Laser-Thickness Monitor" IEEE Jr. of Quantum Electronics, 6-1969, pp. 338–339.
Eisenstadt et al. "Automatic Semiconductor Positioning System" IBM Tech. Disclosure Bull. vol. 4-1972, pp. 3370–3371.

Primary Examiner—John K. Corbin
Assistant Examiner—Wm. H. Punter
Attorney, Agent, or Firm—Holman & Stern

[57] ABSTRACT

To determine a dimension of an object, two emitted beams whose axes define a known angle are directed by means of a deflector onto points of the object related to the dimension to be determined so that when one beam falls on the first of two points defining the dimension the other beam falls on the second point. Light rays reflected by the two points are received as two beams by means of a receiver. The angle of incidence of the emitted beam is measured with respect to a direction. The angles made respectively by the axes of the two received beams with the axes of the emitted beams are measured. The dimension is calculated from the angles.

21 Claims, 4 Drawing Figures

PROCESS FOR DETERMINING A DIMENSION OF AN OBJECT

FIELD OF THE INVENTION

The present invention relates to an optical process for determining a dimension of an object, such as the width of a flange of a section leaving a rolling mill.

BACKGROUND OF THE INVENTION

There are numerous optical processes for measuring the dimensions of objects and in particular the dimensions of the transverse cross-section of rolled sections by taking measurements of distances and in general of angles associated with these distances. These types of processes involve scanning the cross-section with a transmitting field under the action of at least one deflector actuated by a rotational or translational movement.

The Applicant has, for example, already proposed a process in which a beam of radiation is transmitted onto the section and part of the radiation reflected by the section is detected by means of a receiver. The transverse cross-section is scanned by means of a rotating deflector and the reflected beam is kept in the field of observation of the receiver by synchronising the orientation of the transmitter and receiver axes.

The results obtained by such processes have proved very satisfactory and thus not only the quality of the rolled product but also the quality of the rolling operation have been able to be checked and monitored.

There is, however, always an interest in increasing the speed and accuracy of these measurements, on the one hand for reasons of economy and on the other hand for reasons of monitoring efficiency. If fact, production rates are continuously increasing and in order to monitor the products during manufacture measurements must be taken increasingly quickly. Furthermore, when long products or articles are produced it is important to be able to repeat the measurements as frequently as possible along the products so as to locate better the transition between a correct dimension and a dimension outside the permitted tolerance.

SUMMARY OF THE INVENTION

In order to avoid any misunderstanding it should be stated that, in order to define a dimension, there are chosen, within the scope of the present invention, points related to the said dimension, In general these points are two in number and are the ends of the said dimension. However, two series of points may also define a dimension, and the projection onto a perpendicular to the surface on which the object rests of the distance separating any one of the points of the first series from any one of the points of the second series may constitue this dimension. This is the case, for example, when one considers the width of the flange of a section, where the two series of points enabling the width to be defined may consist on the other hand of the points located on the end of the flange and on the other hand of the points located on the web of the section.

The present invention provides a process in which two beams are emitted simultaneously whose axes define a known angle, these two beams are directed onto points of the object related to the dimensions to be determined so that when one of these beams falls on one of the two points defining a dimension the second beam falls on the second point, the two beams retransmitted by the two points related to the said dimension are collected, measurements are made, with respect to a reference direction, of the angle of incidence of the emitter axis as well as the angles made respectively by the axes of the two retransmitted beams with the incident beams, and, by means of the triangulations thus carried out, the desired dimensions are calculated in a manner that is simple and known per se.

The two beams whose axes define a known angle may be derived from light from a single emitter, this light having been divided by means of a suitable optical unit, for example, a semi-reflecting mirror.

The known angle defined by the axes of the two beams emitted in the direction of the object is preferably a constant angle.

It is advantageous to measure, with respect to a reference direction, the angle of incidence of the emitter axis by adjusting the position of the deflector intended to maintain the direction of the two beams emitted onto the points of the object related to the dimensions being determined.

Preferably, the angles made respectively by the axes of the two beams received from the object with the incident beams are measured by means of data provided by the receiver.

In the case of a linear receiver, for example a photodiode assembly, the angles made respectively by the axes of the two beams received from the object with the incident beams are measured by setting the position of the two elements by the abscissae of the two sensitised diodes.

The emitted beam or beams are advantageously in the form of coherent directed beams, for example laser beams, preferably defined by means of a diaphragm and focussed by means of an objective onto the object whose dimensions it is desired to determine.

Preferably the points of the object related to the dimensions to be determined are scanned in accordance with a specific plan.

The optical system is preferably situated wholly in a plane containing the emission axis and the reception axis. In the case where the dimensions of a transverse cross-section of an object are determined, the plane containing the emission and reception axes advantageously coincides with the plane of the said transverse cross-section.

It is particularly advantageous if a minimum scanning zone is defined and, on the one hand, the scanning is restricted to the limits of this minimum zone and, on the other hand, the said minimum zone is restricted to the position of the object.

In the case of a rolled section the minimum scanning zone may be the end of a flange.

It is also very advantageous if, when focussing the beams on the object, this focussing is carried out at varying distances depending on the distance between the points defining the dimensions to be measured.

According to another particular way of carrying out the process of the invention, two beams are transmitted onto the object by means of a first deflector, the beams retransmitted by the said object are intercepted by means of a linear receiver, using a second deflector, during the time taken by the first deflector to scan one of the different parts of the contour of the object, the second deflector completely scans all the said different parts of the contour of the object, and the optical elements are arranged with respect to one another so that the beams retransmitted by one of the different parts of the contour of the object remain substantially on the same abscissa or horizontal axis of the receiver during the scanning of the said part of the contour.

Preferably, in the case where the dimensions of a transverse cross-section of the object are measured, the optical elements concerned with the emission are situated in the plane of the said transverse cross-section and, on the receiving side, the axis around which the scanning occures and the axis of orientation of the linear receiver are parallel and intercept the emitter plane at two points situated on a straight line perpendicular to the plane of the flange of the section.

It is especially advantageous if the angle made by the plane of emission with the plane formed by the receiving elements consisting of the scanning axis and the orientation axis of the linear receiver has a value of 45°.

According to yet another preferred feature of the invention, two beams are simultaneously emitted whose axes define a known angle and the said beams are directed onto the points of the object related to the dimensions to be determined so that when one of the two beams falls on one of the two points defining a dimension, the second beam falls on the second point.

In the case where the object can deviate from its normal position, the position of the object if fixed by triangulation using a secondary system comprising a receiver and a deflector. The secondary receiver is advantageously a photodiode array on which an image of the transverse cross-section of the object is formed, the position of the edges of the object corresponding to the end diodes of the illuminated part.

DESCRIPTION OF PREFERRED EMBODIMENTS

Figure 1:
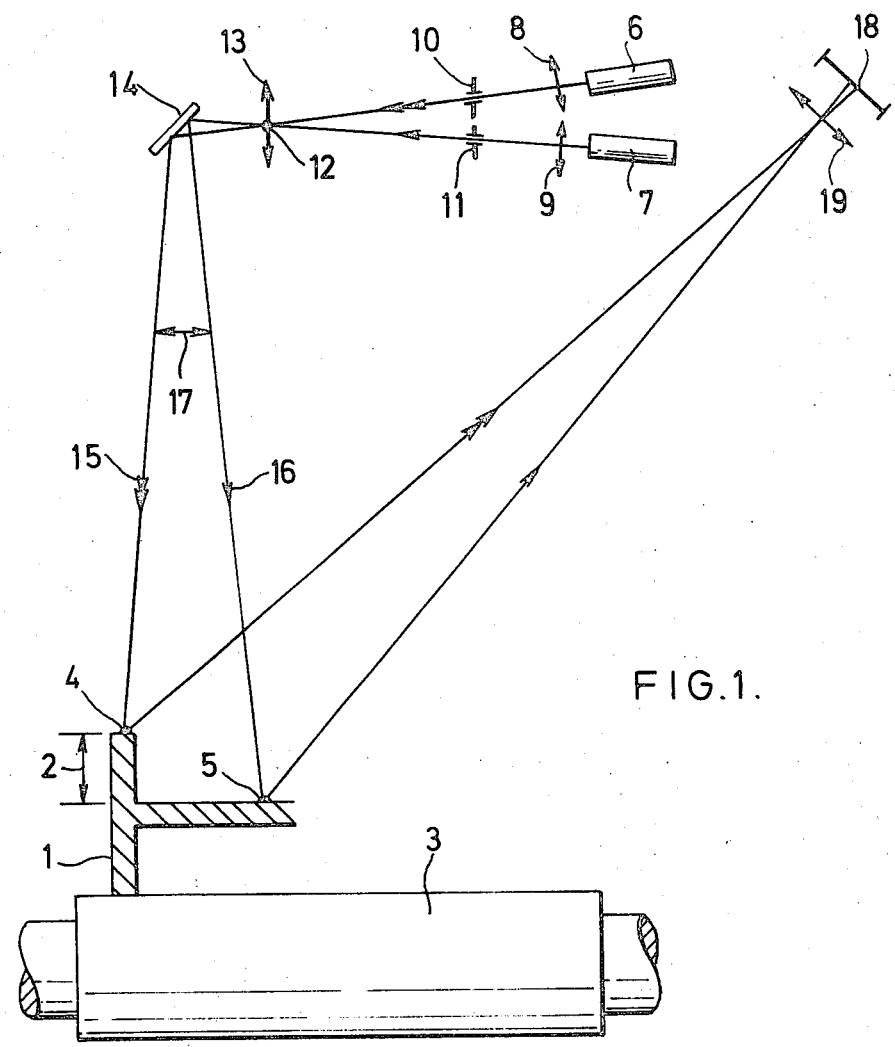
FIG. 1 diagrammatically illustrates the measurement of the width of the flange of a section by means of two laser beams emitted by two different sources.

According to FIG. 1, a rolled section 1, whose flange width 2 is to be determined, moves on a rolling track 3 situated at the exit of a hot rolling mill. The flange width 2 may be determined from the position of a point 4 on the upper end of the flange and a point 5 on the web of the section 1.

As regards the light emission, two lasers 6 and 7 are employed each of which emits a beam that is first focussed by means of object lenses 8 and 9 on diaphragms 10 and 11 intended to define accurately the cross-section of each beam. The two beams then pass through an optical centre 12 where they are focussed by means of an object lens 13 onto the section 1.

The section 1 is scanned by means of the vibrating mirror 14 which is intended to direct the two reflected beams 15 and 16, defining a constant angle 17, in such a way that when the beam 15 falls on the point 4 the beam 16 falls on the point 5. The reflected light is received by means of a receiver 18 provided with a photodiode array on which the light is focussed by means of an object lens 19.

The plane in which the optical system formed by the transmission and reception axes is situated coincides with the plane of the transverse cross-section of the section 1 containing the points 4 and 5.

Figure 2:
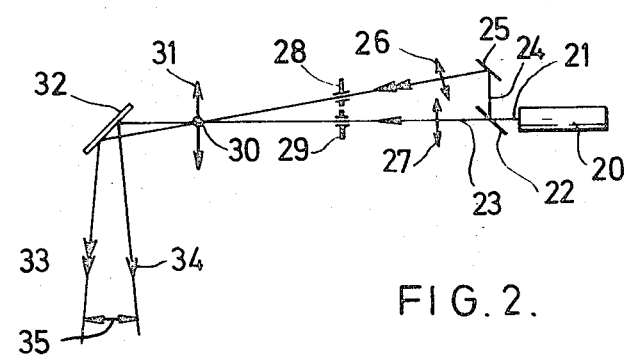
FIG. 2 diagrammatically illustrates the formation of two beams defining a constant angle, from light emitted by a single source.

According to FIG. 2, a laser 20 is employed that emits a beam of light 21 directed onto an optical divider unit 22 (a semi-reflecting mirror) which produces two beams 23 and 24 whose relative positions are adjusted by means of a mirror 25. These beams are focussed by means of object lenses 26 and 27 onto diaphragms 28 and 29, following which the two beams pass through an optical centre 30 where they are focussed by means of an object lens 31 onto the section being investigated (as in FIG. 1).

The section is again scanned by means of a vibrating mirror 32 which serves to orientate the two beams 33 and 34, defining a constant angle 35, depending on the dimensions to be determined.

Figure 3:
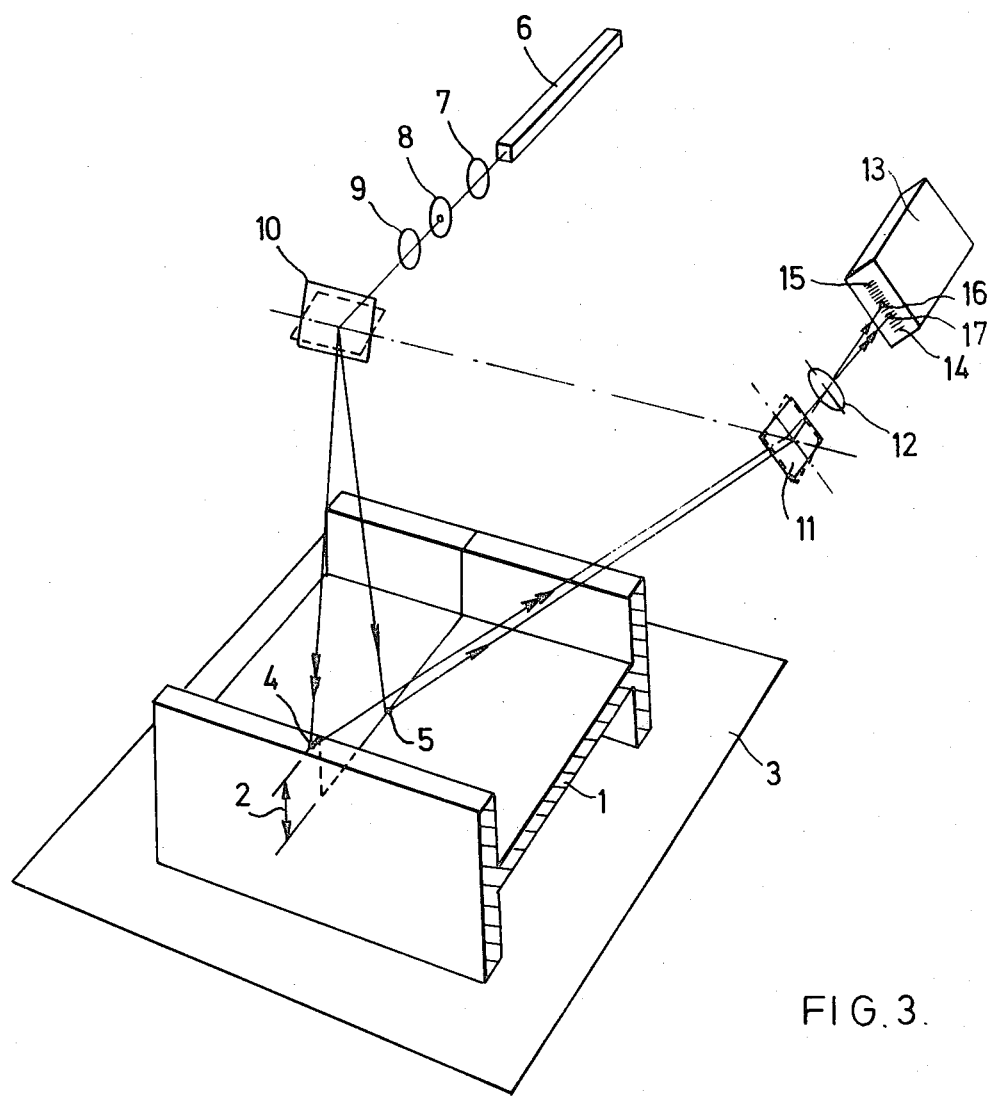
FIG. 3 diagrammatically illustrates a section, the width of whose flange is to be measured by means of a laser beam.

According to FIG. 3, the section 1 whose flange width 2 is to be measured is situated on a support 3. The flange width 2 is again defined by a point 4 situated on the upper end of the flange and by a point 5 situated on the web of the section 1. If one knows the projections onto a perpendicular to the support 3 of the distances of the points 4 and 5 with respect to a reference point, then the flange width 2 may be determined by subtracting these projections from one another.

A beam is transmitted from a laser 6 onto an object lens 7 which focusses this beam onto a diaphragm 8. On leaving the diaphragm, the beam (whose cross-section is now clearly defined) is focussed on the point 4 by means of an object lens 9. A mirror 10, whose movement serves to cause the upper end of the flange and part of the web containing the point 5 to be scanned by the emitted beam, ensures that the beam strikes the point 4. Light reflected by the point 4 is intercepted by a mirror 11, which directs it onto a photodiode array 14–15 of a receiver 13 after passing through a focussing object lens 12.

While the mirror 10 slowly scans the upper end of the flange, the mirror 11 rapidly scans this same region, and the receiving units 11 to 15 are arranged in such a way that the light rays received from the upper end of the flange falls substantially on the same point 17 of the photodiode array 14–15, thereby producing a more intense illumination of the diode at the point 17 than is the case with other methods, given that the diodes of the array 14–15 are normally rectangular, with the longest side perpendicular to the axis of the array 14–15.

After having scanned the upper end of the flange, the emitted beam scans that part of the web containing the point 5. As in the case of the point 4, the light rays received from the part of the web containing the point 5 fall substantially on the same place 16 of the photodiode array 14–15, thereby producing an illumination of the diode at the point 16 more intense than is the case with other methods.

A knowledge of the positions of the points 16 and 17 as well as of the mirrors 10 and 11 enables the flange width 2 to to be determined by triangulation.

Figure 4:
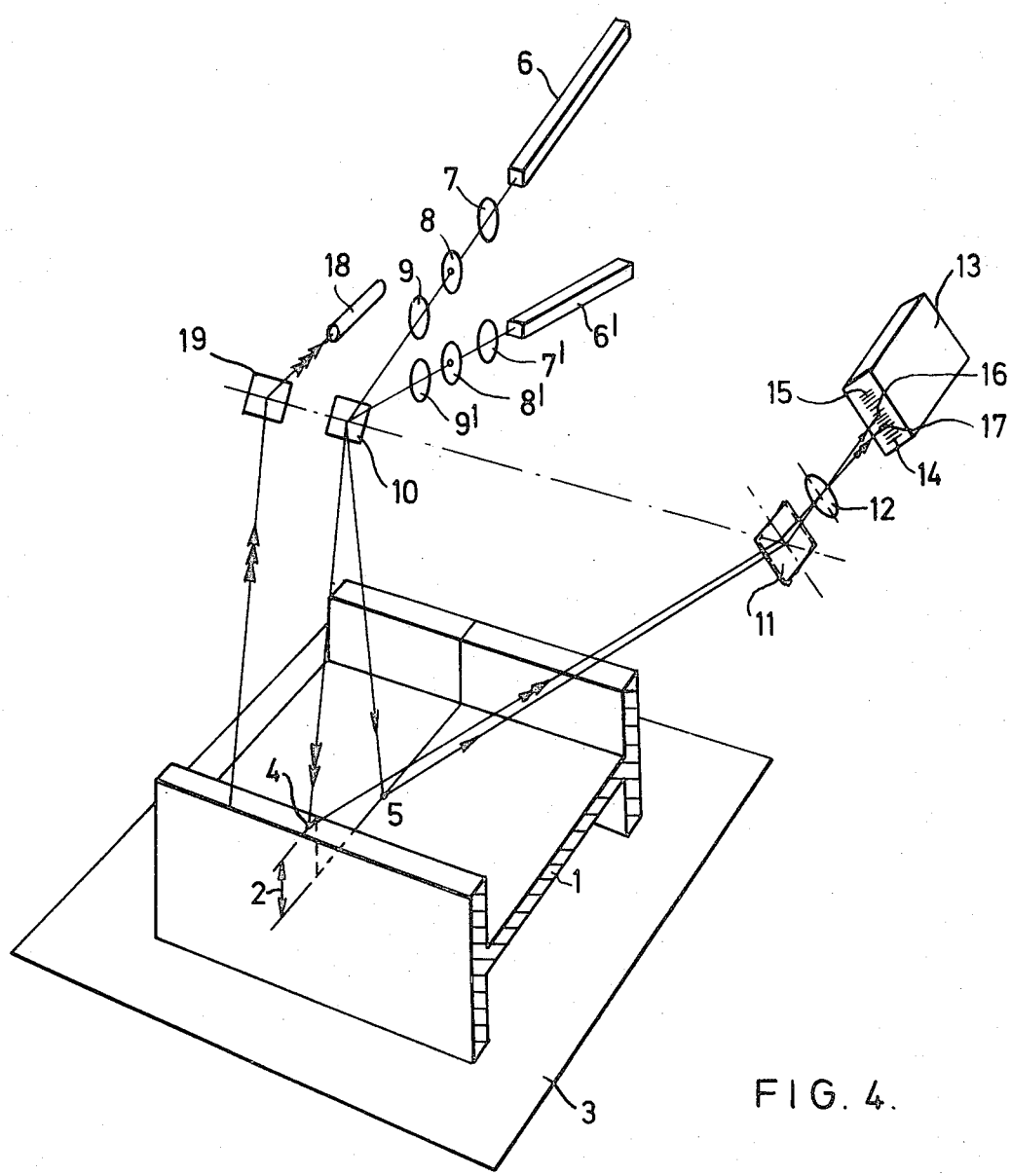
FIG. 4 diagrammatically illustrates a section, the width of whose flange is to be measured by means of two laser beams defining a known angle.

The reference numerals 1 to 17 of FIG. 4 denote the same integers as those in FIG. 3.

In FIG. 4, a second laser emitter 6′, an object lens 7′ for focussing on a diaphragm 8′, and a second object lens 9′ for focussing on the section 1 have been added. This modification of the emission arrangement of FIG.

4 with respect to FIG. 3 is intended to direct two beams defining a known angle onto the section 1 in such a way that when one beam falls on the point 4, the other beam falls on the point 5.

Light reflected simultaneously by the points 4 and 5 is received by the diodes at the points 17 and 16 respectively, by virtue of the arrangement of the receiving system. As in the case of FIG. 3, the diodes at the points 16 and 17 are illuminated more intensely than according to other methods.

The section 1 of FIG. 4 is assumed to be a hot product which may deviate from its normal position on the support 3; a secondary system is therefore used to locate the instantaneous position of the section 1. This secondary system comprises a receiver 18 and a mirror 19, by means of which the instantaneous position of the section 1 may be determined by triangulation. The mirror 19 is oscillated so that the receiver 18 scans the field in which the section 1 should be situated. When the receiver 18 is illuminated following the detection of the section 1, the position of the mirror 19 is reset to that corresponding to a control or reference position of the emitter mirror 10 around which the mirror 10 oscillates. During the subsequent scanning of the mirror 19, a new instruction is passed to the mirror 10, whose position is thus controlled by the mirror 19 and, via the latter, by the position of the edge of the flange of the profiled section 1.

The expression 'linear receiver' as used in the present invention denotes a receiver one of whose dimensions, for example the length, is larger with respect to another dimension for example the width.

I claim:

1. A process for determining a dimension of an object, comprising: directing two diverging emitted beams, whose axes define a known angle, by means of a deflector onto points of the object related to the dimension to be determined so that when one of these beams falls on the first of two points defining the dimension the other beam falls on the second point; receiving light rays reflected by the two points as two received beams, by means of a receiver; measuring, with respect to a reference direction, the angle of incidence of the emitted beams and the angles made respectively by the axes of the two received beams with the axes of the emitted beams; and calculating the dimension from the angles 2. The process of claim 1, wherein the two emitted beams are from two separate emitters.

3. The process of claim 1, wherein the two emitted beams are obtained from a single light beam from a single emitter, by splitting the single light beam by means of an optical unit.

4. The process of claim 1, wherein the known angle made between the axes of the two emitted beams is a constant angle.

5. The process of claim 1, wherein the angle of incidence of the emitted beams is measured, with respect to a reference direction, by determining the position of the deflector.

6. The process of claim 1, wherein the angles made respectively by the axes of the two received beams with the emitted beams are determined from information supplied by the receiver.

7. The process of claim 1, wherein the receiver is a linear receiver and the said information is the positions of the two parts of the receiver which intercept the two received beams.

8. The process of claim 1, wherein the emitted beams are coherent directed beams.

9. The process of claim 1, including scanning the points of the object relating to the said dimension according to a specific plan.

10. The process of claim 1, wherein the axes of the emitted and received beams lie in the same plane.

11. The process of claim 10, wherein the dimension is a dimension of a transverse cross-section of the object, and the said plane coincides with the plane of the transverse cross-section.

12. The process of claim 1, including defining a minimum scanning zone and restricting scanning to the limits of this minimum zone, the minimum zone being restricted to the position of the object.

13. The process of claim 12, wherein minimum scanning zones are defined so that they are adjacent.

14. The process of claim 13, wherein the object is a section having a flange, and a minimum scanning zone is the end of the flange.

15. The process of claim 1, including focussing the emitted beams on the object at varying distances according to the distance between the points defining the dimension to be measured.

16. The process of claim 1, wherein the received beams are intercepted by a linear receiver with the aid of a further deflector, during the time taken by one deflector to scan one of the different parts of the contour of the object the other deflector completely scans all the said different parts of the contour of the object, and the optical elements are arranged with respect to one another in such a way that the beams received from one of the different parts of the contour of the object remain substantially on the same abscissa of the linear receiver during the scanning of the said part of the contour.

17. The process of claim 16, wherein the dimension is a dimension of a transverse cross-section of the object, the optical elements concerned with the emission are situated in the plane of the said transverse cross-section, and on the receiving side the axis around which scanning takes place and the axis of orientation of the linear receiver are parallel and intercept the emitter plane at two points situated on a straight line perpendicular to the plane of a support on which the object rests.

18. The process of claim 16, wherein the angle made by the plane of emission with the formed by the receiving elements consisting of the scanning axis and the axis of orientation of the linear receiver has a value of 45°.

19. The process of claim 1, wherein, in the case where the object can deviate from its normal position, the position of the object 16 is fixed by triangulation using a secondary system comprising a receiver and a deflector.

20. The process of claim 19, wherein the secondary receiver is a photodiode array on which the image of the transverse cross-section of the object is formed, the position of the edges of the object corresponding to the end diodes of the illuminated part of the array.

21. A method of determining a dimension of an article, comprising the steps of:
   directing a beam at the article by means of a first mobile deflector and scanning the part of the profile of the article comprising the dimension to be measured;
   orientating rays reflected by the article in the direction of at least one receiver by means of a second mobile deflector;
   angularly moving the deflectors at different speeds;

determining the positions occupied by two points related with the dimension to be measured; and calculating the dimension with respect to these points; and wherein during the time taken by one of said deflectors to scan one of the various parts of the profile of the article, the other one of said deflectors completely scans all of the said various parts of the profile of the article, the optical members being arranged one with respect to the other in such a way that the rays reflected by one of the various parts of the profile of the article remain substantially at the same abscissa of the linear receiver during scanning of the said part of the profile; and wherein two beams are simultaneously emitted, the axes of the beams forming a known angle therebetween, the two beams being directed at the points associated with the dimension to be determined so that when one of two beams strikes one of the two points defining the dimension, the second beam strikes the second point.

* * * * *